US009148885B2

(12) United States Patent
Jaklllari et al.

(10) Patent No.: US 9,148,885 B2
(45) Date of Patent: Sep. 29, 2015

(54) DISTRIBUTED ASSIGNMENT OF FREQUENCY CHANNELS TO TRANSCEIVERS OVER DYNAMIC SPECTRUM

(75) Inventors: Gentian Jakllari, Cambridge, MA (US); Subramanian Ramanathan, Westford, MA (US); Jason Keith Redi, Belmont, MA (US); Daniel Alan Coffin, Sudbury, MA (US); William Nii Tetteh, Cambridge, MA (US); John Robert Burgess, Burlington, MA (US); Ryan Edward Irwin, Blacksburg, VA (US)

(73) Assignee: Raytheon BBN Technologies Corp., Cambridge, MA (US)

(*) Notice: Subject to any disclaimer, the term of this patent is extended or adjusted under 35 U.S.C. 154(b) by 802 days.

(21) Appl. No.: 12/404,895

(22) Filed: Mar. 16, 2009

(65) Prior Publication Data

US 2010/0232372 A1    Sep. 16, 2010

(51) Int. Cl.
*H04J 3/16* (2006.01)
*H04W 4/00* (2009.01)
*H04W 72/06* (2009.01)
*H04W 72/04* (2009.01)
*H04W 84/18* (2009.01)

(52) U.S. Cl.
CPC .......... *H04W 72/06* (2013.01); *H04W 72/0406* (2013.01); *H04W 84/18* (2013.01)

(58) Field of Classification Search
USPC ......... 370/230, 235, 252, 254–255, 329, 338, 370/437; 709/220–222, 227–229
See application file for complete search history.

(56) References Cited

U.S. PATENT DOCUMENTS

| 8,144,725 | B2* | 3/2012 | Bienas et al. ................. 370/449 |
| 2004/0106408 | A1* | 6/2004 | Beasley et al. ................ 455/436 |
| 2005/0119006 | A1* | 6/2005 | Cave et al. .................... 455/453 |
| 2006/0067283 | A1* | 3/2006 | So et al. ........................ 370/338 |
| 2006/0256737 | A1* | 11/2006 | Choi et al. .................... 370/254 |
| 2008/0300002 | A1* | 12/2008 | Sheffer ......................... 455/509 |
| 2009/0047950 | A1* | 2/2009 | Doppler et al. ............ 455/435.1 |
| 2009/0122700 | A1* | 5/2009 | Aboba et al. ................. 370/230 |
| 2009/0221287 | A1* | 9/2009 | Balasubramanian et al. 455/434 |
| 2010/0173586 | A1* | 7/2010 | McHenry et al. .............. 455/62 |

OTHER PUBLICATIONS

Brik et al, "DSAP: A Protocol for Coordinated Spectrum Access," 2005 IEEE, pp. 611-614.
Hamdaoui et al, "OS-MAC: An Efficient MAC Protocol for Spectrum-Agile Wireless Networks," IEEE Transactions on Mobile Computing, 7(8):915-930 (2008).
Vedantham et al, "Component Based Channel Assignment in Single Radio, Multi-channel Ad Hoc Networks," MobiCom '06, Sep. 23-26, 2006, Los Angeles, California, 12 pages.

* cited by examiner

*Primary Examiner* — Redentor Pasia
(74) *Attorney, Agent, or Firm* — Ropes & Gray LLP (57) ABSTRACT

The invention relates to systems and methods of operating a wireless network including allocating and assigning frequency channels using a dynamic and distributed process. For example, a network node in an ad hoc wireless network will assign frequency channels to one or more of its transceivers based on at least one of a list of allowed frequency channels and a neighbor-frequency channel list.

24 Claims, 8 Drawing Sheets

| | 602 | 604 | 606 | 608 | 610 | 612 | 614 |
|---|---|---|---|---|---|---|---|
| | Hops | Node | MAC | Assigned/backup | #T | eligible | 1-hop |
| | 1 | A | $A_{MAC}$ | $[1,1_b],[3,3_b]$ | 4 | 7 | B, D, X |
| | 1 | B | $B_{MAC}$ | $[1,1_b], [2,2b]$ | 4 | 7 | A, E, F, X |
| | 1 | C | $C_{MAC}$ | $[3, 3_b], [4,4_b]$ | 4 | 5,7 | H, X |
| | 2 | D | $D_{MAC}$ | [3], [5] | - | - | - |
| | 2 | E | $E_{MAC}$ | [2] | - | - | - |
| | 2 | F | $F_{MAC}$ | [2] | - | - | - |
| | 2 | H | $H_{MAC}$ | [3] | - | - | - |

DISTRIBUTED ASSIGNMENT OF FREQUENCY CHANNELS TO TRANSCEIVERS OVER DYNAMIC SPECTRUM

GOVERNMENT CONTRACT

The U.S. Government has a paid-up license in this invention and the right in limited circumstances to require the patent owner to license others on reasonable terms as provided for by the terms of Contract No. FA8750-07-C-0169 awarded by DARPA.

BACKGROUND OF THE INVENTION

Wireless communications between multiple devices or nodes within a network is becoming more and more prevalent. Currently, the nodes in most wireless multi-hop networks only contain a single transceiver, which only communicates over a single, preset frequency. This limits the maximum data capacity of the nodes and the network. Recent transceiver developments have resulted in transceivers that are cheaper and tunable over a wide frequency band. As a consequence, wireless network nodes can now be equipped with multiple transceivers and operate on multiple, tunable frequencies.

With the new capabilities provided by these tunable multi-transceiver network nodes, new frequency allocation methods are possible. One particular method, known as dynamic spectrum access, enables the assignment of operating frequencies to transceivers in real time, based on conditions of the surrounding network environment. This improved flexibility allows increased network capacity, both in terms of data transmission and number of nodes allowed, because the network can now more efficiently utilize the available spectrum.

To date, however, most dynamic frequency allocation methods are based on a centralized system, where a central computer decides how to allocate frequencies to a plurality of network nodes. This centralized system may lack knowledge of conditions local to particular network nodes, such as location and range, and the overhead involved in the centralized frequency assignments may impact network performance. This is exacerbated if the network contains mobile network nodes. Moreover, current dynamic frequency allocation methods do not consider the effect of non-cooperative nodes.

SUMMARY OF THE INVENTION

There is a need in the art for distributed dynamic frequency channel allocation methods to improve network performance and robustness. Thus, in one aspect, the invention relates to a method of operating a wireless network including allocating and assigning frequency channels using a dynamic and distributed process. For example, a network node in an ad hoc wireless network will assign frequency channels to one or more of its transceivers based on at least one of a list of allowed frequency channels and a neighbor-frequency channel list. The method of frequency channel assignment is further based on determinations of channel eligibility and benefit. Channel eligibility is based on minimizing interference within the network, and benefit is based on improving network parameters and characteristics such as connectivity. Optionally, the frequency channel assignment process includes at least one of a bootstrapping process and an evacuation and reconstitution process. In other aspects, the invention relates to network nodes configured to execute the above-described methods and computer readable media encoding instructions for carrying out the same.

In one aspect, the invention provides a network node configured to communicate among a plurality of other neighbor nodes in a network. The network node comprises a plurality of node transceivers and a processor. The processor is configured to determine if the network node is to be assigned a frequency. The processor is also configured to generate a list of eligible frequencies for assignment to the network node based in part on frequency assignments received from at least one neighboring node. The processor is further configured to select an eligible frequency or frequencies based at least in part on the received assignments. The processor is also configured to assign the selected frequency or frequencies to the network node. In certain embodiments, the processor is configured to transmit a heartbeat message including the assignment of the selected frequency or frequencies to the at least one neighboring node.

In some embodiments, the processor determines if the network node is to be assigned a frequency or frequencies in response to receiving a list of neighbor nodes and the frequencies the listed neighbor nodes use. In certain embodiments, this determination is performed in response to determining a change in the status of a link to one or more neighbor nodes. These neighbor nodes may comprise 1-hop neighbors, 2-hop neighbors, or both.

According to some embodiments, generating the list of eligible frequencies comprises determining the eligibility of a plurality of frequencies. In certain embodiments, the plurality of frequencies is derived from a list of allowed frequencies, and the processor determines frequency eligibility by applying eligibility criteria to the list of allowed frequencies. In some embodiments, the eligibility criteria excludes frequencies used by 2-hop neighbor nodes. In another embodiment, the eligibility criteria excludes all frequencies assigned to at least one of the plurality of transceivers, frequencies simultaneously assigned to a first 1-hop neighbor and a 2-hop neighbor, and frequencies simultaneously assigned to a second 1-hop neighbor and a third 1-hop neighbor, wherein the first 1-hop neighbor is a 1-hop neighbor of the 2-hop neighbor and the second and third 1-hop neighbors are not 1-hop neighbors of each other.

According to one embodiment, the processor is further configured to initially provide a plurality of temporary frequencies to the at least one transceiver to scan and to initially assign the at least one transceiver a temporary frequency selected from the plurality of temporary frequencies.

In another aspect, the invention provides a method for assigning frequencies to a network node for communicating among a plurality of other neighbor nodes in the network. This method includes first determining if the network node is to be assigned at least one frequency. The method includes generating a list of eligible frequencies for assignment to the network node based in part on frequency assignments received from at least one neighboring node. The method also includes selecting at least one eligible frequency based at least in part on the received assignments. The method further includes assigning the selected frequency or frequencies to the network node. In certain embodiments, the method includes transmitting a heartbeat message including the assignment of the selected frequency or frequencies to at least the neighboring node.

In yet another aspect, the invention provides a computer readable medium storing computer executable instructions, which, when executed by a processor, cause the processor to carry out a method of assigning frequencies to a network node for communicating among a plurality of other network nodes in the network. This method includes determining if the network node is to be assigned at least one frequency. This method also includes generating a list of eligible frequencies for assignment to the network node based in part on frequency assignments received from at least one neighboring node. This method further includes selecting at least one eligible frequency based at least in part on the received assignments. This method also includes assigning the selected frequency or frequencies to the network node. In certain embodiments, the method includes transmitting a heartbeat message including the assignment of the selected frequency or frequencies to at least the neighboring node.

In certain embodiments listed above, the selected frequency or frequencies are assigned to one or more transceivers. Optionally, two or more transceivers will operate as one or more transceiver teams. In some of the embodiments listed above, the selection of an eligible frequency or frequencies comprises determining benefit values for respective frequencies on the list of eligible frequencies. Optionally, these benefit values are based on at least one of the number of additional nodes the network node will be linked to if the frequency is assigned to the network node and the total number of linked nodes in the network if the frequency is assigned to the network node.

Other aspects and advantages of the invention are described below.

BRIEF DESCRIPTION OF THE DRAWINGS

The system and methods may be better understood from the following illustrative description with reference to the following drawings in which.

DETAILED DESCRIPTION OF AN
ILLUSTRATIVE EMBODIMENT

To provide an overall understanding of the invention, certain illustrative embodiments will now be described, including systems, methods, and software for dynamically and distributively assigning frequency channels in a wireless network. However, it will be understood by one of ordinary skill in the art that the systems, methods and software described herein may be adapted and modified as is appropriate for the application being addressed and that the systems, methods, and software described herein may be employed in other suitable applications, and that such other additions and modifications will not depart from the scope thereof.

Figure 1:
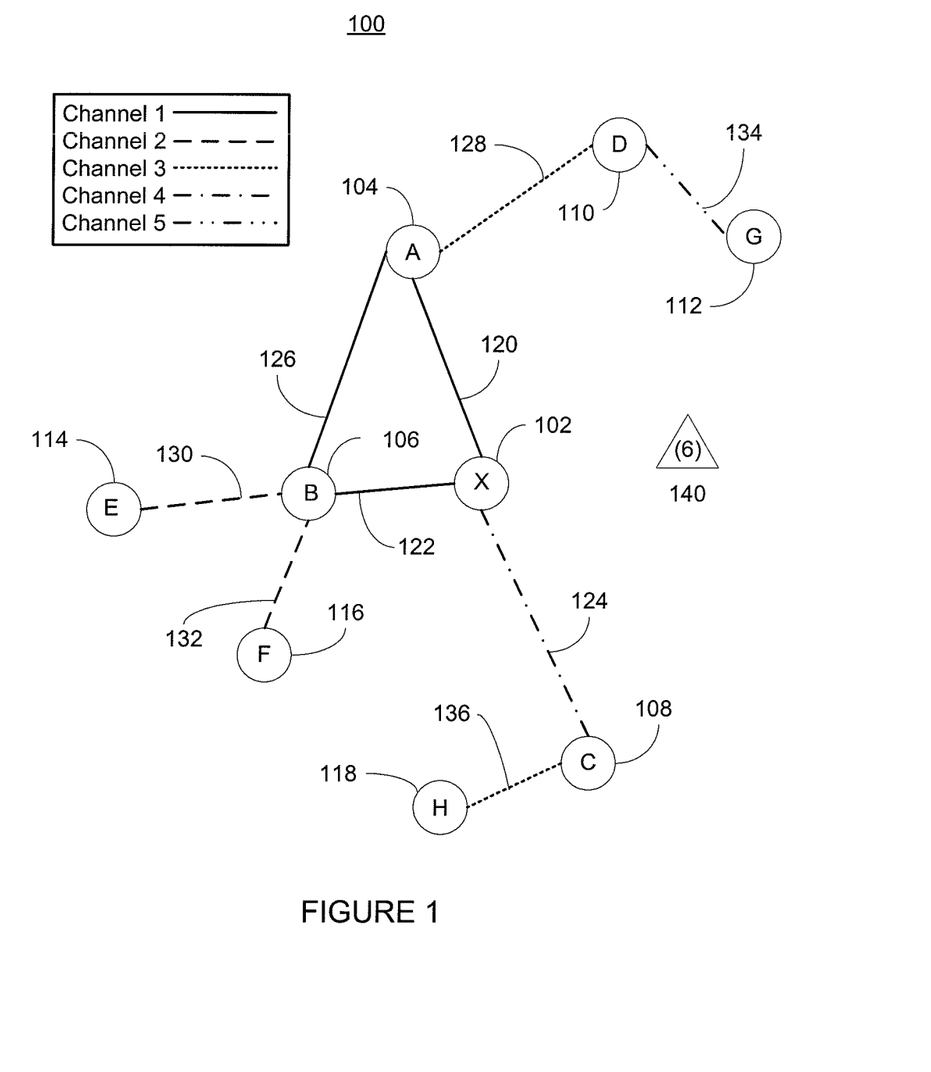
FIG. 1 is a conceptual diagram of an ad hoc wireless network.

FIG. 1 is a conceptual diagram of an ad hoc wireless network 100, according to an illustrative embodiment of the invention. The general notion of the ad hoc wireless network 100 is well known in the art. In general, the ad hoc network 100 includes a plurality of wireless network nodes (nodes 102-118). These nodes may be mobile, resulting in the topology of the ad hoc wireless network 100 frequently changing. The nodes 102-118 are linked to one another via links 120-136, which may or may not operate on similar frequency channels. Two particular nodes are classified as 1-hop, 2-hop, or X-hop neighbors, where X is an integer, based on the number of links present in the shortest link path between the two nodes. For example, node X (102) has 1-hop neighbors A (104), B (106), and C (108), 2-hop neighbors D (110), E (114), F (116), and H (118), and a 3-hop neighbor G (112). Likewise, node C (108) has 1-hop neighbors X (102) and H (118), 2-hop neighbors A (104) and B (106), 3-hop neighbors D (110), E (114), and F (116), and 4-hop neighbor G (112).

The ad hoc network 100 may also include one or more non-cooperative nodes (e.g., node 140). Non-cooperative nodes do not communicate with the network nodes 102-118, and may not even know of the presence of the nodes 102-118. Non-cooperative nodes operate on one or more frequency channels; for example, non-cooperative node 140 operates on channel 6, denoted as a number within parentheses. Non-cooperative nodes typically have superseding rights to use portions of the spectrum used by the nodes 102-118. For example, non-cooperative nodes may be associated with the primary owner of the spectrum in use. Thus, the network nodes 102-118 are not allowed to assign and must vacate any frequency channel(s) occupied by a non-cooperative node.

The network nodes 102-118 each have one or more links to neighboring nodes, where each link operates on one or more frequency channels. For illustrative purposes, different channels are depicted as different linestyles, as outlined in the legend. For example, in the embodiment illustrated in FIG. 1, node X (102) has a link 120 to node A (104) on channel 1, a link 122 to node B (106) also on channel 1, and a link 124 to node C (108) on channel 4. Similarly, node B (106) shares the link 122 on channel 1 to node X (102), and also has a link 126 to node A (104) on channel 1, a link 130 to node E (114) on channel 2, and a link 132 to node F (116) on channel 2. A link may be established between two 1-hop neighbor nodes if they both have at least one common frequency channel assigned and are within range of each other.

Figure 2:
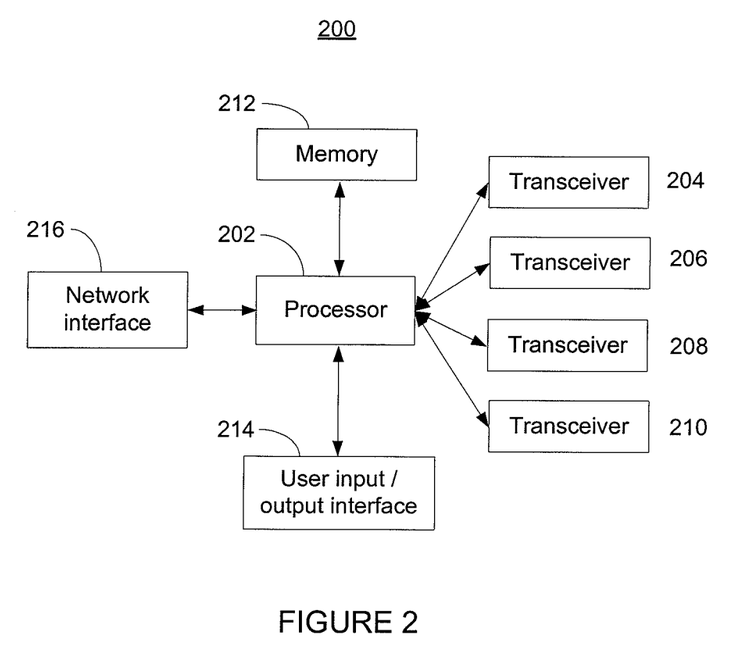
FIG. 2 depicts components within a network node within the ad hoc wireless network of FIG. 1.

FIG. 2 is a depiction of the components in a wireless network node 200, similar to the wireless nodes 102-118, according to an illustrative embodiment of the invention. In this embodiment, a processor 202 is a central processing unit of a general purpose computer running specialized communications software. In other implementations, the processor 202 may be implemented using one or a combination of a general or special purpose computer, software, and analog or digital integrated circuits, including, without limitation, application specific integrated circuits (ASICs) and digital signal processors (DSPs). The processor 202 is linked to at least one transceiver, 204-210. While four transceivers are shown in this illustration, this is not meant to limit the number of transceivers that the processor 202 may be linked to. The transceivers 204-210 are each associated with one or more links with neighboring nodes. Each link comprises at least one transceiver, and a transceiver may be part of more than one link. In certain embodiments, multiple transceivers will operate as a transceiver team, for example as a multi-input multi-output (MIMO) team, and future uses of the word "transceiver" may mean either a single transceiver or transceiver team. Optionally, the processor 202 is also linked to a user input/output interface 214 through which a user may provide or obtain information, such as a keyboard, LCD display, or other user input and output device. A memory 212 linked to the processor 202 is used to store information received or being processed by the processor 202, and may include RAM, ROM, and other fixed and/or removable memory or media, such as hard drives, flash memory drives, and other magnetic, optical, or magneto-optical media. An optional network interface 216 provides additional network connectivity to the processor 202, in addition to any transceivers that may be present.

Figure 3:
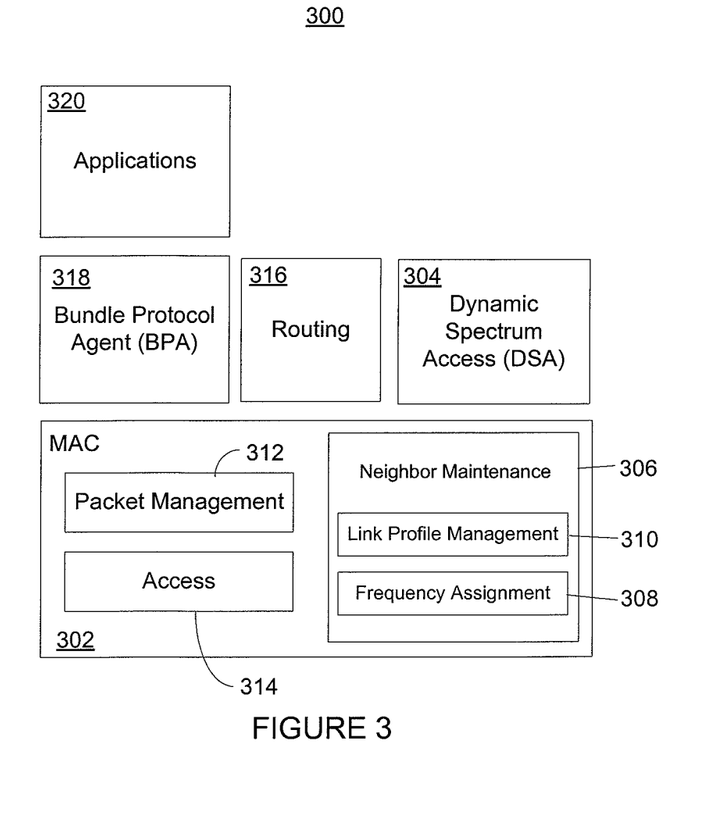
FIG. 3 is a conceptual block diagram of a network node within the ad hoc wireless network of FIG. 1.

FIG. 3 is a conceptual block diagram of a wireless network node 300, similar to the wireless nodes 102-118 and 200, according to an illustrative embodiment of the invention. In certain embodiments, the network node 300 comprises a spectrum analyzer (SA) module 304, a routing module 316, a bundle protocol agent module 318, an applications module 320, and a media access control (MAC) module 302.

The SA module 304 maintains a list of allowed frequency channels based on non-cooperative node presence and system policy, and communicates this information to the MAC module 302. Suitable SA modules include those provided by, for example, Shared Spectrum Company (SSC) of Vienna, Va.

The applications module 320 manages applications that may utilize the network transport capabilities of the network node 300. For example, applications may generate bundles or packets that are transmitted to the bundle protocol agent module 318 for transmission to another node via the network.

The routing module 316 determines the best route for a bundle traveling through the current node using a routing table that describes the network topology, and in conjunction with the bundle protocol agent module 318, prepares bundles for transmission onto the network. The routing module may use any suitable routing algorithm known in the art, including, e.g., proactive/table-driven routing such as Babel, reactive/on-demand routing such as Ariadne, flow-oriented routing such as LQSR (Link Quality Source Routing), adaptive routing such as TORA (Temporally-Ordered Routing Algorithm), hybrid routing such as ZRP (Zone Routing Protocol), hierarchical routing protocols such as GSR (Global State Routing), geographic routing protocols such as LAR (Location-Aided Routing), power-aware routing such as PARO (Power-Aware Routing Optimization Protocol), multicast routing such as CBM (Content Based Multicast), geographical multicast routing such as LBM (Location Based Multicast), or any other suitable routing algorithm or protocol.

The bundle protocol agent (BPA) module 318 is responsible for forwarding bundles to endpoints in the network. A bundle is the unit of information transfer in the bundle protocol, similar to a datagram or packet in other protocols. A BPA endpoint is identified by a uniform resource identifier (URI) corresponding to a node or an application operating on a node.

The bundles to be forwarded arise from three sources: applications (or their agents) within a node, other (neighbor) nodes, and the BPA module 318 itself. Bundles are delivered to endpoints within the node or are forwarded to neighboring nodes. The BPA module 318 acts as an endpoint registrar. Applications can register themselves to be certain endpoints. This registration allows the BPA module 318 to recognize when a received bundle should be delivered to that application. The registration is also supplied to the routing module 316 so that the routing module 316 can collaborate with routing modules in other nodes to effect delivery of bundles for the endpoint to the correct node.

The MAC module 302 controls the links to neighbor nodes and the network node transceivers 204-210, and comprises a neighbor maintenance module 306, a packet management module 312, and an access module 314. The neighbor maintenance module 306, comprising a frequency assignment (FA) sub-module 308 and a link profile management sub-module 310, determines and provides link or transceiver channel assignments for the network node 300 via a frequency channel assignment process, described further in relation to FIG. 4, below. The packet management module 312 provides localized packet routing for data transfer through the node, and the access module 314 controls the network node transceivers 204-210. Each module and/or sub-module may be implemented in software, for example in a higher level programming language such as C, C++, JAVA, Pascal, etc. The software can be encoded on a computer readable medium such as a magnetic, optical, or magneto-optical storage media or other form of RAM or ROM. Various features may also be implemented in hardware, such as in an application specific integrated circuit, a field programmable gate array, or other integrated circuit.

Figure 4:
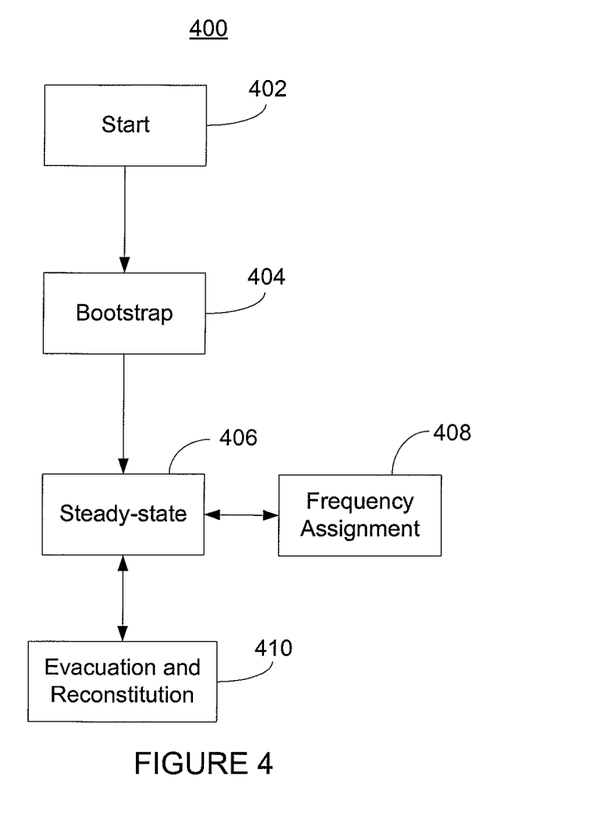
FIG. 4 is a flowchart of a method of creating and maintaining frequency channel assignments for a network node in a network, according to an illustrative embodiment of the invention.

FIG. 4 is a flowchart depicting a frequency channel assignment process 400 for a wireless node 300 according to an illustrative embodiment of the invention. When a local network node 300 is first powered on (start, 402), it begins a bootstrapping process 404 during which the FA sub-module 308 provides temporary frequencies and frequency range assignments to node transceivers via the access module 314 to begin scanning for the presence of neighbors. The temporary frequencies and frequency ranges are based on an allowed channels list provided by the SA module 304. The bootstrapping process is described further in relation to FIG. 5. The local network node 300 then moves to a steady state process 406, during which it monitors its neighbors, links, and available frequency channels. If neighbor-related information changes during the steady state process 406, the link profile management sub-module 310 will send an updated neighbor-frequency channel list to the FA sub-module 308, which triggers the frequency assignment process 408. The frequency assignment process is described further in relation to FIG. 8. After the frequency assignment process 408 is complete, the local node moves back to steady state process 406. If the SA module 304 provides an updated allowed channels list, and a channel previously assigned by the local node now is not on the allowed list, then the local node will trigger an evacuation and reconstitution process 410, described further in relation to FIG. 7, to replace the now forbidden channel with a backup channel. Subsequently, the local node will return to the steady state process 406. In certain embodiments, the FA sub-module 308 will periodically query the SA module 304, the link profile management sub-module 310, or both instead of waiting to receive the allowed channels or neighbor-frequency channel lists.

Figure 5:
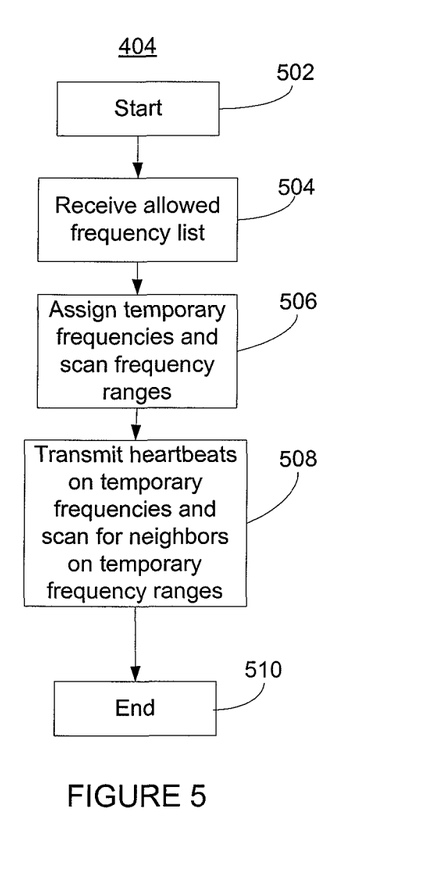
FIG. 5 is a flowchart of a method for bootstrapping performed by the network node of FIG. 3, according to an illustrative embodiment of the invention.

FIG. 5 is a flowchart depicting a bootstrap process 404 according to an illustrative embodiment of the invention. After the bootstrap process begins at step 502, a list of allowed frequency channels is generated by the SA module 304 and provided to the FA sub-module 308 (step 504). An allowed frequency channel is a frequency channel that is deemed by the SA module 304 to not have a non-cooperative node operating on it or is not otherwise restricted by system policy. In this embodiment, channels have a consistent ordering across all nodes. This ordering is used to denote the rank of a particular channel. For example, the channels depicted in FIG. 1 may be ordered as shown, with channel 1 at the top of the order, followed by, in order, channels 2, 3, 4, 5, 6, and 7 (not shown). This order directly reflects the rank of each channel—i.e. channel 1 is ranked higher than channels 2-7; channel 2 is ranked higher than channels 3-7, etc. Channel labels or markers need not correspond to either channel order or channel rank—e.g. in other embodiments, channel 4 may be at the top of the order, and may have the highest rank. Channel rank is used in calculating channel benefit values, detailed below in connection to step 806 of FIG. 8, and in certain embodiments may be used to determine other network characteristics. In general, all other things being equal, the node will assign higher-ranking channels to transceivers before assigning lower-ranking channels.

Using the allowed frequency channel list, the FA sub-module 308 generates assignments of temporary frequency channels and channel ranges to one or more transceivers and sends the assignments to the access module 314, which implements the assignments (step 506). These temporary channels are only used for neighbor discovery, and not for normal data transmission. The one or more transceivers then begin transmitting heartbeat messages on the assigned temporary frequency channels and scanning the assigned temporary channel ranges to detect neighbor heartbeat broadcasts on those channels (step 508), after which the process ends (step 510). Heartbeat messages are used to communicate information relating to the current state of the network as seen from the sender node, and are broadcast periodically from every assigned channel, temporary or not. The state of a link between two neighboring nodes can be determined based on the number of periodic heartbeat messages received in a certain time window. For example, a link between node A and B is deemed to be up if a certain configured threshold of heartbeat messages sent by A are received at B and vice versa. A heartbeat message includes a sender node identification and identification of neighbor nodes to which the sender node has a functional link, i.e. nodes which meet the heartbeat threshold requirement mentioned above. In one implementation, a heartbeat message from a particular node includes all information necessary to populate a row of a neighbor-frequency channel list, described in further detail in relation to FIG. 6. Received information is forwarded to the link profile management sub-module 310, which will compile the information into neighbor-frequency channel lists.

Figure 6:
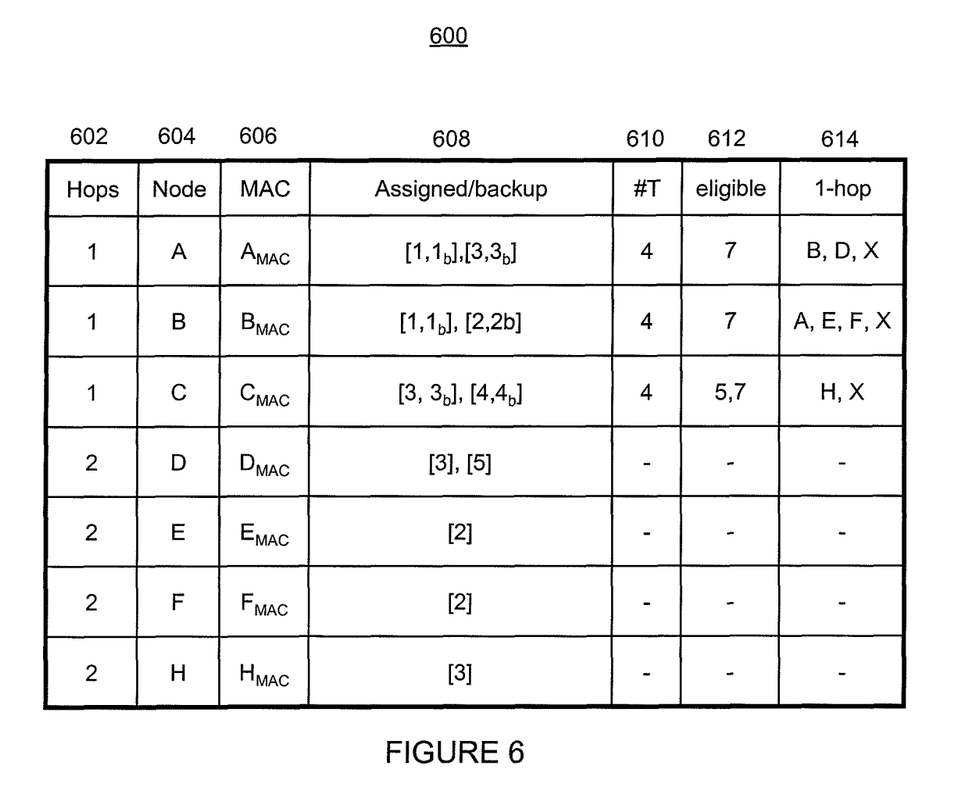
FIG. 6 is a depiction of a neighbor-channel list in accordance with an illustrative embodiment of the invention.

FIG. 6 is a depiction of a neighbor-frequency channel list 600 that may be generated by the link profile management sub-module 310 from received heartbeat messages and received by the FA sub-module 308 in accordance with an illustrative embodiment of the invention. A neighbor-frequency channel list contains information relating to neighbor nodes of a particular reference node. For example, the list 600 is a neighbor-frequency channel list for node X (102) as shown in FIG. 1. In this example, node X is the reference node. The neighbor-frequency channel list 600 includes information about each neighbor node such as its distance from reference node (602), its name (604), its MAC address (606), its assigned frequency channels and backup channels (608), the number of transceivers the neighbor node has (610), frequency channels eligible for assignment by the neighbor node (612), and its 1-hop neighbors (614). The distance field 602 indicates how far away a given neighbor node is from the reference node, in terms of hops. Referring to both FIG. 1 and FIG. 6, node A (104) is directly linked to reference node X (102), whereas node D (110) is linked to reference node X (102) via node A (104). Therefore, node A is a 1-hop neighbor of X and node D is a 2-hop neighbor of X, and accordingly, the distance field 602 for node A contains a "1" and the distance field 602 for node D contains a "2". The neighbor node name field 604 comprises a unique system identifier for a particular neighbor node. The neighbor node MAC address parameter 606 lists the unique media access control (MAC) address for a particular neighbor node. The assigned/backup channel field 608 lists the frequency channels and backup frequency channels that a particular neighbor node has assigned, in the following format:

[1st assigned channel, 1st backup channel], [2nd assigned channel, 2nd backup channel], . . .

In certain embodiments, each assigned frequency channel has a corresponding backup channel in case evacuation is necessary. The evacuation and reconstitution process is discussed in more detail below, in relation to step 706 in FIG. 7. The transceiver number field 610 indicates the number of transceivers on a particular neighbor node. The eligible channel field 612 indicates the eligible channels a particular neighbor node has for assignment. The 1-hop neighbor field 614 lists the names of 1-hop neighbors of a particular neighbor node. In this embodiment, only 1-hop and 2-hop neighbor nodes are listed in neighbor-frequency channel list 600, and certain values are not listed for 2-hop neighbor nodes, such as backup channels, number of transmitters, eligible channels, or 1-hop neighbors. Optionally, all information can be listed for all neighbor nodes.

Figure 7:
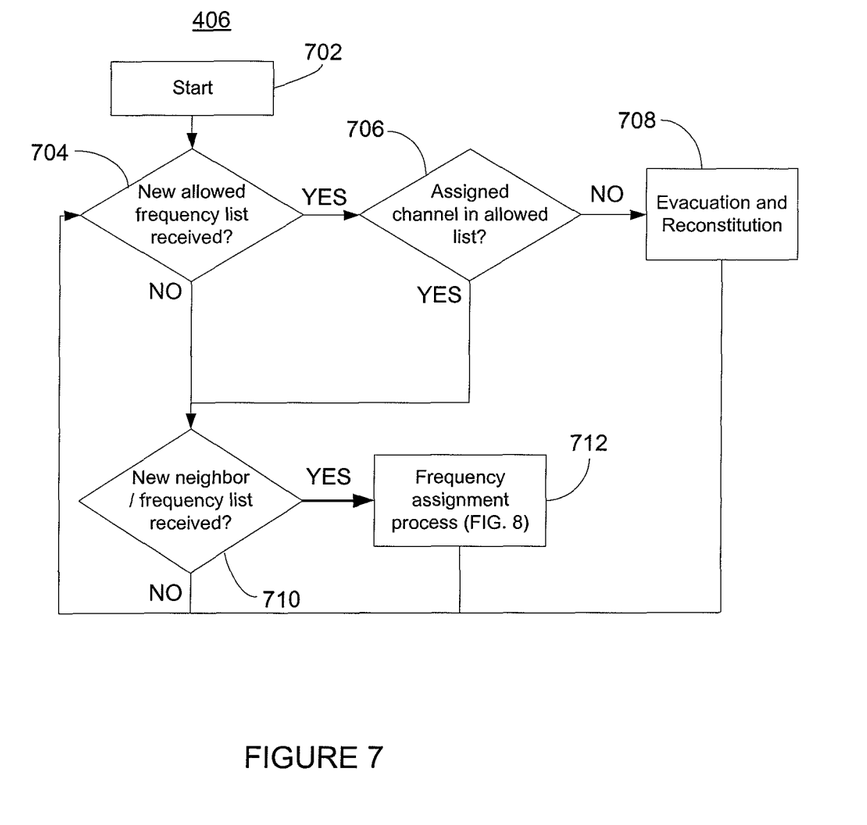
FIG. 7 is a flowchart of a method for a steady-state channel assignment and maintenance process performed by the network node of FIG. 3, according to an illustrative embodiment of the invention.

FIG. 7 is a flowchart depicting a steady-state process 406 in accordance with an illustrative embodiment of the invention. The steady-state process 406 executes in a continuous cycle after the bootstrap process 404, the frequency assignment process 408, and the evacuation and reconstitution process 410. After the steady-state process 406 begins at step 702, the local network node 300 constantly monitors neighbor, link, and channel information. During the steady-state process 406, if the FA sub-module 308 receives a new allowed frequency list (step 704), it will check to see if all frequency channels previously assigned by the local node remain on the new allowed frequency list (step 706). If not, the evacuation and reconstitution process 708 is invoked, which is described in more detail below. If all previously assigned frequency channels remain allowed, then the local node proceeds to step 710. If no new allowed frequency list is received, the local node also proceeds to step 710. In step 710, if the FA sub-module 308 receives a new neighbor-frequency channel list, it executes the frequency assignment process 712, detailed further below in relation to FIG. 8. Otherwise, the process loops back to step 704.

In the embodiment, the FA sub-module 308 receives the allowed frequency and neighbor-frequency channel lists from the SA module 304 and the link profile management sub-module 310, respectively. Optionally, the FA sub-module 308 may receive one or both lists from other sources, either internal or external to network node 300.

In certain embodiments, the FA sub-module 308 actively requests the allowed frequency list or the neighbor-frequency channel list instead of waiting for them to be sent. For example, the FA sub-module 308 will request an allowed frequency list from the SA module 304 instead of waiting for the SA module 304 to transmit it. Likewise, the FA sub-module 308 will request a neighbor-frequency channel list from link profile management sub-module 310 instead of waiting for it to transmit it. In certain embodiments, the FA sub-module 308 will request list transmission periodically or upon detection of certain events.

The evacuation and reconstitution process 708 is executed by the local node upon the detection of one or more evacuation events involving one or more assigned channels. Following are illustrative examples of events that will cause the execution of the evacuation and reconstitution process 708:

Evacuation Example 1

In this example, the FA sub-module 308 receives a new allowed channels list from the SA module 304 that is missing a previously-assigned channel, as per steps 704 and 706 in FIG. 7. In this embodiment, this is due to either the detection of a non-cooperative node operating on the previously assigned channel or to a change in network policy. In this case, the local node will move the link from the originally assigned frequency channel to a backup frequency channel. In certain embodiments, each assigned channel has an associated backup channel that is determined during the frequency assignment process. Optionally, the node will broadcast the backup frequency channel on the previously assigned channel before moving the link to the backup channel.

Evacuation Example 2

In this example, the local node detects that a link to a neighboring node has been lost. In certain embodiments, transmission and receipt of heartbeat messages as described previously determine link status. If the local node detects that the heartbeat signals from a linked neighbor node has decreased in rate or disappeared altogether, the local node may decide that the link has been lost. As a result, the local node will check the backup frequency channel associated with the frequency channel previously assigned to that link. If the local node does not initially detect the neighbor node on the backup channel, it will periodically check the backup channel until it senses the neighbor on the backup channel, it senses the neighbor on the originally-assigned channel, or it senses the neighbor on a channel newly-assigned by the FA sub-module 308. If at any point the local node detects that the neighbor node is operating on the backup channel, it will move the link from the originally-assigned channel to the backup channel. As in example 1, optionally the local node will broadcast the backup channel on the originally-assigned channel before moving the link.

Evacuation Example 3

In this example, the local node detects that a neighboring node has broadcast a backup frequency channel on an assigned channel. If this is the case, then the local node will move any links on that assigned channel to the broadcast backup frequency channel. Optionally, the local node will also broadcast the received backup channel on the originally-assigned channel.

In the embodiments above where a backup channel is broadcast by the local node or a neighboring node, instead of broadcasting the backup channel, the node may broadcast an evacuate command. In this case, nodes receiving the evacuate command will move any links on the channel that received the evacuate command to the associated, pre-determined backup channel. In all embodiments above, backup channels may instead be dynamically determined at the time of evacuation or some other time rather than at the time the original channel is assigned.

Figure 8:
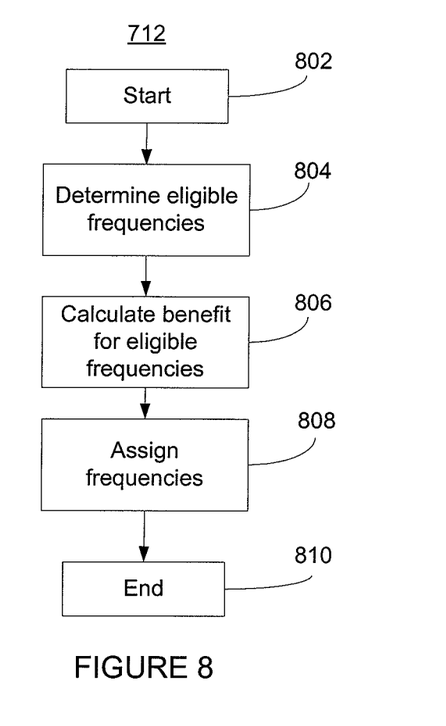
FIG. 8 is a flowchart of a method for determining channel eligibility and benefit performed by the network node of FIG. 3, according to an illustrative embodiment of the invention.

FIG. 8 is a flowchart depicting a frequency assignment process 712 according to an illustrative embodiment of the invention. In this embodiment, the frequency assignment process 712 is executed by FA sub-module 308. After the process begins (step 802), the FA sub-module 308 determines eligible frequencies from a previously-received allowed frequency channels list and neighbor-frequency channel list, based on one or more eligibility criteria (step 804). Eligibility criteria are designed to reduce interference at a node caused by multiple neighbors broadcasting on the same frequency channel. This reduction may be accomplished in part by sufficient physical separation between broadcasting neighbors. A frequency channel is deemed ineligible if assigning it in a local node leads to unacceptable interference with other nodes or with another transceiver in the local node. Thus, eligibility of a channel is based on the channels used by one or more neighbor nodes. In other embodiments, other eligibility criteria or design constraints may be used. The eligibility determination process is performed by the FA sub-module 308 upon previous receipt of an allowed frequency channel list from the SA module 304 and a neighbor-frequency channel list from the link profile management module 310. Each network node performs its own eligibility determination, due to varying local network topology. Following are illustrative examples of eligibility calculation processes.

Eligibility Example 1

In this example, a frequency channel is ineligible for a local node if any of its 2-hop neighbors have already assigned the channel. For each channel in the allowed frequency channel list, the FA sub-module 308 determines via the neighbor-frequency channel list if it has already been assigned by a 2-hop neighbor. If it has, then that channel is ruled ineligible. With reference to the network topology described in FIG. 1, if node X (102) is assumed to be the local node, then any channels assigned by 2-hop neighbors of X, such as D (110), E (114), F (116), and H (118), are ineligible. Node D (110) has channels 3 (128) and 5 (134) assigned. Nodes E and F have channel 2 (130) assigned. Node H (118) has channel 3 (136) assigned Thus, channels 2, 3, and 5 are ineligible for node X.

Eligibility Example 2

In this example, a frequency channel is ineligible for a particular local node if (a) the channel has been assigned to another transceiver at the local node, (b) the channel has been assigned by both a 1-hop neighbor and a 2-hop neighbor of the local node, where the 1-hop neighbor and 2-hop neighbor are 1-hop neighbors of each other, or (c) it has been assigned by two 1-hop neighbors of the local node, where the two 1-hop neighbors are not 1-hop neighbors of each other. Referring to FIG. 1 and the network topology described therein, if node X (102) is assumed to be the local node, then channels 1, 2, 3, and 4 are ineligible. Channels 1 and 4 have already been assigned to links or transceivers in node X (120, 122, 124). Channel 2 is ineligible because it has been assigned by a 1-hop neighbor of X (node B, 106) and a 2-hop neighbor of X which is a 1-hop neighbor of node B (nodes E and F, 114 and 116, respectively). Channel 3 is ineligible for two reasons: first, because it has been assigned by node A (104, 1-hop neighbor of X) and node D (110, 2-hop neighbor of X, 1-hop neighbor of A), and second, because it has been assigned by two 1-hop neighbors of X (nodes A and C, 104 and 108, respectively).

In all of the above embodiments and examples, eligibility determination is performed for each allowed frequency channel individually. In certain embodiments, the eligibility of all allowed channels may be evaluated simultaneously, for example via a matrix calculation.

Benefit Value Calculation

Subsequent to the eligible frequency determination, the FA sub-module 308 calculates benefit values for each eligible frequency based on one or more benefit functions (step 806). Each network node performs its own benefit value calculation. Once a set of eligible frequency channels for the local node has been determined, the next step is for the FA sub-module 308 to determine which channels to assign to transceivers. In certain embodiments, the selection of the subset of channels for assignment to transceivers is accomplished by means of a benefit value function. For each frequency channel eligible for assignment, the benefit value function provides a channel benefit value which is correlated to the desirability of assigning that channel. The benefit value function is tailored to optimize one or more network parameters, such as connectivity. For example, the benefit value function may be designed to increase the number of 1-hop neighbors linked to a particular node. Another benefit function may be designed to increase the number of 2-hop neighbors linked to a particular node, or some combination of the number of 1-hop and 2-hop neighbors. Alternately, the benefit function may be designed to increase the number of exclusive nodes linked to a particular node, or some other network parameter or parameters.

The benefit value calculation begins assuming that the list of eligible channels from the eligibility determination process 804 and a neighbor-frequency channel list are available. In one embodiment, the benefit value calculation proceeds along channel rank. In other words, benefit values for higher-ranked channels are determined before benefit values for lower-ranked channels. For example, if a set of channels 1, 2, 3, 4, and 5 are ranked according to their numerical indicator, with channel 1 the highest-ranked and channel 5 the lowest-ranked, then the benefit value for channel 1 will be determined first, and the benefit value for channel 5 will be determined last. As will become evident, depending on the selected benefit value calculation algorithm, the order in which benefit values are calculated may determine the benefit of a particular channel. Optionally, channels that are currently assigned are ranked higher than channels that are not currently assigned. By means of illustration, suppose that of the five channels in the previous example (1, 2, 3, 4, and 5), channels 3, 4, and 5 are currently assigned to transceivers on the local node and channels 1 and 2 are not. Channels 3, 4, and 5 now outrank channels 1 and 2, and the benefit value calculation will start with channel 3, proceed through channels 4 and 5, then move to channel 1 and finally channel 2. Following are illustrative examples of benefit value calculations. All examples will be based on the network topology depicted in FIG. 1 and table of FIG. 6. Node X (102) is the local node, and the eligibility determination was based on Eligibility Example 2, above, with the stipulation that node X initially has no assigned channels. Thus, eligible channels for X in the follow examples are 1, 4, 5, and 7.

Benefit Value Example 1

Exclusive 1-Hop Neighbors

In this example, benefit value calculations are directed toward increasing the number of 1-hop neighbor nodes connected to the local node. An exclusive 1-hop neighbor node is a 1-hop neighbor node that has not been accounted for in the overall benefit calculation. Thus, a 1-hop neighbor node that is eligible for both channels 1 and 2 counts as an exclusive node for channel 1 but not for channel 2, because the benefit value for channel 1 is determined before channel 2, and the node was already counted for channel 1. Since no channels have been previously assigned by node X, the default channel ranks hold, and the benefit value for channel 1 is determined first. Nodes A, B, and C are 1-hop neighbors to node X, but only nodes A and B can communicate with node X via channel 1, because node C is not already using or eligible to use channel 1. Hence, channel 1 has two exclusive nodes, A and B, and the benefit value for channel 1 is 2. Channels 2 and 3 are ineligible, as per Eligibility Example 2 above. The benefit value for channel 4 is 1, because only node C is already using or eligible to use channel 4. The benefit value for channel 5 is zero, because although node C is eligible to use channel 5, node C is not an exclusive neighbor of channel 5, because node C has already been accounted for in the benefit value calculation for channel 4. Channel 6 is not allowed, and channel 7 has a benefit value of zero, because while all of nodes A, B, and C are eligible to use channel 7, none of those nodes are exclusive to channel 7. Note that if channel 7 had been the highest ranked channel, then it would have had a benefit of 3, because A, B, and C would have been exclusive nodes.

Benefit Value Example 2

Exclusive 2-Hop Neighbors

In this example, benefit value calculations are directed toward increasing the number of 2-hop neighbor nodes connected to the local node. As with Benefit Value Example 1, the benefit value for channel 1 is determined first. If X assigns channel 1, it will be linked to 2-hop neighbors D, E, and F. Hence, the benefit value for channel 1 is 3. Channels 2 and 3 are ineligible. Channel 4 has a benefit value of 1, because assigning it will link X to 2-hop neighbor H. Assigning channel 5 will do the same, but because H has already been counted for channel 4, node H is not an exclusive node for channel 5, and hence the benefit value for channel 5 is zero. Channel 6 is not allowed, and channel 7 also has a benefit value of zero, because D, E, F, and H have already been accounted for.

Optionally, benefit value calculations may be directed toward increasing the benefit values of neighbors that are more important than others in achieving some design goal, such as increasing network connectivity. For example, the importance of a node may be correlated to its available slots for channel assignment. A node Y with a single unassigned transceiver may be more important than a node Z with two unassigned transceivers, because node Y has less linking availability. In this case, eligible channels may be ranked so that a channel that can provide a link to node Y has a larger benefit value than a channel that can provide a link to node Z but not to node Y.

Once benefit values have been determined for all eligible channels, the FA sub-module 308 will assign channels to transceivers based on the benefit values, with the highest-valued channels being assigned first. Channels with zero benefit values will not be assigned to a transceiver. In certain embodiments, if channels have previously been assigned to transceivers at the present node, the FA sub-module 308 will not change the previous channel assignments if none of the previously-assigned channels are determined to have a new benefit value of zero. However, if a channel previously assigned to a transceiver is determined to have a new benefit value of zero, then a different channel with a nonzero benefit is assigned to that transceiver, if such a channel is available. Optionally, after initial frequency channels have been assigned, the FA sub-module 308 also assigns backup frequency channels to one or more transceivers based on the calculated benefit. In all of the above embodiments, any transceiver that is not assigned a frequency channel as a result of the frequency assignment process 712 is assigned a temporary frequency and a frequency range for scanning, as in bootstrap process 404 depicted in FIG. 5.

The invention may be embodied in other specific forms without departing from the spirit or essential characteristics thereof. The foregoing embodiments are therefore to be considered in all respects illustrative, rather than limiting of the invention.

The invention claimed is:

1. A network node configured to communicate among a plurality of other neighbor nodes in a network, comprising:
   a plurality of node transceivers; and
   a processor configured to:
      determine if the network node is to be assigned at least one frequency;
      initially provide to at least one node transceiver of the plurality of node transceivers a plurality of temporary frequencies to scan;
      initially assign to the at least one node transceiver a temporary frequency selected from the plurality of temporary frequencies, wherein the temporary frequency is used for neighbor node discovery;
      using the temporary frequency, receive frequency assignments from at least two neighboring nodes, wherein the frequency assignments from the at least two neighboring nodes indicate different frequencies;
      generate a list of eligible frequencies for assignment to the network node based in part on the received frequency assignments by determining eligibility of a plurality of frequencies derived from a list of allowed frequencies, wherein determining frequency eligibility comprises applying eligibility criteria to the list of allowed frequencies, the eligibility criteria excluding frequencies assigned to at least one of the plurality of node transceivers, frequencies simultaneously assigned to a first 1-hop neighbor and a 2-hop neighbor, and frequencies simultaneously assigned to a second 1-hop neighbor and a third 1-hop neighbor, and wherein the first 1-hop neighbor is a 1-hop neighbor of the 2-hop neighbor and the second and third 1-hop neighbors are not 1-hop neighbors of each other;
      select at least one eligible frequency based at least in part on the received frequency assignments; and
      assign the at least one selected frequency to the network node, wherein the at least one selected frequency is used for data transmission.

2. The network node of claim 1, wherein assigning the at least one selected frequency to the network node comprises assigning each of the at least one selected frequency to a corresponding node transceiver.

3. The network node of claim 1, wherein the processor is configured to transmit a heartbeat message comprising the assignment of the at least one selected frequency to at least the neighboring node.

4. The network node of claim 1, wherein the processor determines if the network node is to be assigned the at least one selected frequency in response to receiving, using the temporary frequency, a list of neighbor nodes and the frequencies the listed neighbor nodes use, wherein the listed neighbor nodes comprise 1-hop neighbors.

5. The network node of claim 4, wherein the listed neighbor nodes further comprise 2-hop neighbors.

6. The network node of claim 1, wherein the processor determines if the network node is to be assigned at least one frequency in response to determining a change in the status of a link to the neighboring node.

7. The network node of claim 1, wherein the eligibility criteria excludes frequencies used by 2-hop neighbor nodes.

8. The network node of claim 1, wherein selecting the at least one eligible frequency comprises determining benefit values for respective frequencies on the list of eligible frequencies.

9. The network node of claim 8, wherein the benefit value of a frequency is based at least in part on the number of additional nodes the network node will be linked to if the frequency is assigned to the network node.

10. The network node of claim 8, wherein the benefit value of a frequency is based at least in part on the total number of linked nodes in the network if the frequency is assigned to the network node.

11. The network node of claim 1, wherein the frequency assignments received from the at least two neighboring nodes were assigned by the respective neighboring nodes.

12. The network node of claim 1, wherein at least two of the plurality of node transceivers operates as one or more transceiver teams.

13. A method for assigning frequencies to a network node for communicating among a plurality of other neighbor nodes in a network, comprising:
   determining if the network node is to be assigned at least one frequency;
   initially providing to at least one node transceiver of the network node a plurality of temporary frequencies to scan;
   initially assigning to the at least one node transceiver a temporary frequency selected from the plurality of temporary frequencies, wherein the temporary frequency is used for neighbor node discovery;
   using the temporary frequency, receiving frequency assignments from at least two neighboring nodes, wherein the frequency assignments from the at least two neighboring nodes indicate different frequencies;
   generating a list of eligible frequencies for assignment to the network node based in part on the received frequency assignments by determining eligibility of a plurality of frequencies derived from a list of allowed frequencies, wherein determining frequency eligibility comprises applying eligibility criteria to the list of allowed frequencies, the eligibility criteria excluding frequencies assigned to at least one of the plurality of node transceivers, frequencies simultaneously assigned to a first 1-hop neighbor and a 2-hop neighbor, and frequencies simultaneously assigned to a second 1-hop neighbor and a third 1-hop neighbor, and wherein the first 1-hop neighbor is a 1-hop neighbor of the 2-hop neighbor and the second and third 1-hop neighbors are not 1-hop neighbors of each other;
   selecting at least one eligible frequency based at least in part on the received frequency assignments; and
   assigning the at least one selected frequency to the network node, wherein the at least one selected frequency is used for data transmission.

14. The method of claim 13, further comprising assigning the at least one selected frequency to at least one node transceiver.

15. The method of claim 13, further comprising transmitting a heartbeat message including the assignment of the at least one selected frequency to at least the neighboring node.

16. The method of claim 13, wherein selecting the at least one eligible frequency comprises determining benefit values for respective frequencies on the list of eligible frequencies.

17. The method of claim 16, wherein the benefit value of a frequency is based at least in part on the number of additional nodes the network node will be linked to if the frequency is assigned to the network node.

18. The method of claim 16, wherein the benefit value of a frequency is based at least in part on the total number of linked nodes in the network if the frequency is assigned to the network node.

19. A non-transitory computer readable medium storing computer executable instructions, which, when executed by a processor, cause the processor to carry out a method of assigning frequencies to a network node for communicating among a plurality of other neighbor nodes in a network, the method comprising:
- determining if the network node is to be assigned at least one frequency;
- initially providing to at least one node transceiver of the network node a plurality of temporary frequencies to scan;
- initially assigning to the at least one node transceiver a temporary frequency selected from the plurality of temporary frequencies, wherein the temporary frequency is used for neighbor node discovery;
- using the temporary frequency, receiving frequency assignments from at least two neighboring nodes, wherein the frequency assignments from the at least two neighboring nodes indicate different frequencies;
- generating a list of eligible frequencies for assignment to the network node based in part on the received frequency assignments by determining eligibility of a plurality of frequencies derived from a list of allowed frequencies, wherein determining frequency eligibility comprises applying eligibility criteria to the list of allowed frequencies, the eligibility criteria excluding frequencies assigned to at least one of the plurality of node transceivers, frequencies simultaneously assigned to a first 1-hop neighbor and a 2-hop neighbor, and frequencies simultaneously assigned to a second 1-hop neighbor and a third 1-hop neighbor, and wherein the first 1-hop neighbor is a 1-hop neighbor of the 2-hop neighbor and the second and third 1-hop neighbors are not 1-hop neighbors of each other;
- selecting at least one eligible frequency based at least in part on the received frequency assignments; and
- assigning the at least one selected frequency to the network node, wherein the at least one selected frequency is used for data transmission.

20. The non-transitory computer readable medium of claim 19, storing computer readable instructions for causing the processor to assign the at least one selected frequency to at least one node transceiver.

21. The non-transitory computer readable medium of claim 19, storing computer readable instructions for causing the processor to transmit a heartbeat message including the assignment of the at least one selected frequency to at least the neighboring node.

22. The non-transitory computer readable medium of claim 19, wherein selecting the at least one eligible frequency comprises determining benefit values for respective frequencies on the list of eligible frequencies.

23. The non-transitory computer readable medium of claim 22, wherein the benefit value of a frequency is based at least in part on the number of additional nodes the network node will be linked to if the frequency is assigned to the network node.

24. The non-transitory computer readable medium of claim 22, wherein the benefit value of a frequency is based at least in part on the total number of linked nodes in the network if the frequency is assigned to the network node.

* * * * *